Dec. 2, 1969  E. M. JOST ET AL  3,481,023
METHOD OF MAKING A COMPOSITE METAL PRODUCT
Original Filed Jan. 15, 1962
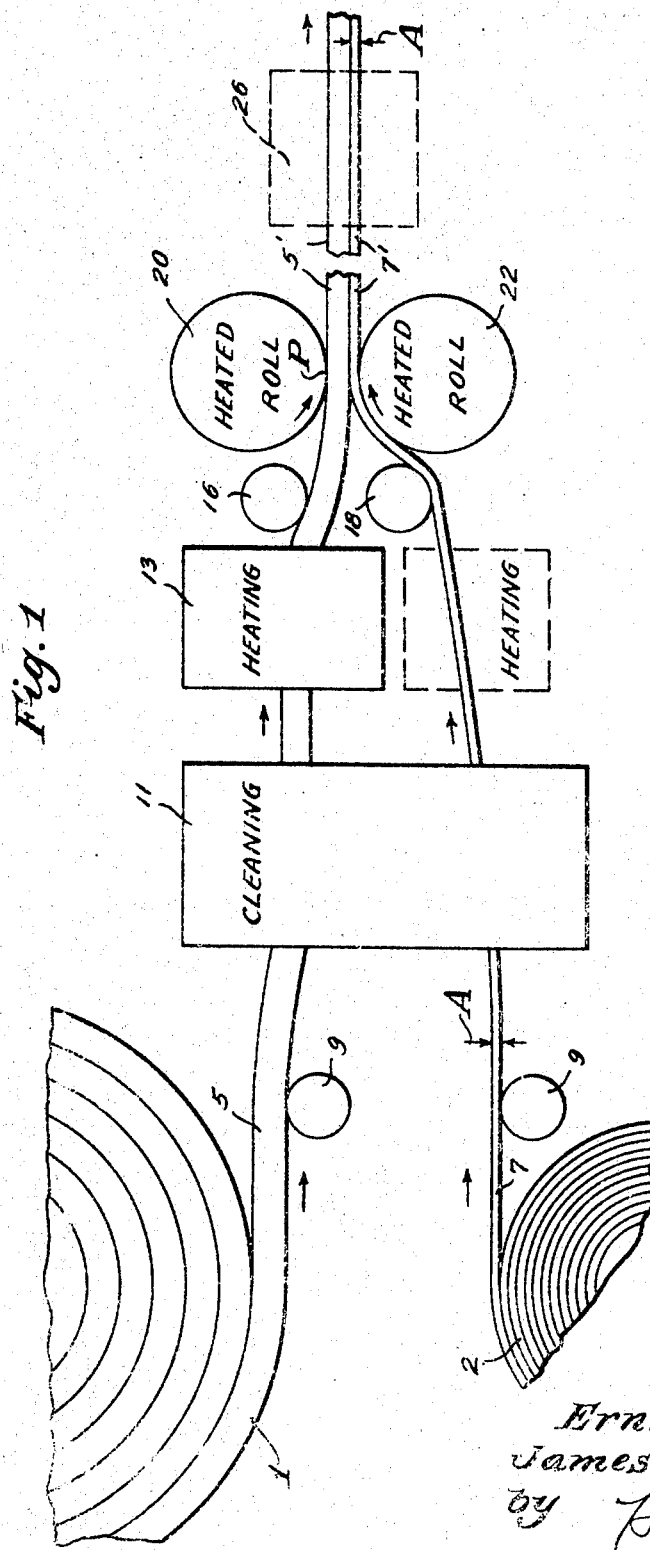
Inventors:
Ernst Maria Jost,
James Joseph Cadden,
by Harold Levine Att'y.

United States Patent Office 3,481,023
Patented Dec. 2, 1969

3,481,023
METHOD OF MAKING A COMPOSITE METAL
PRODUCT
Ernst M. Jost, Attleboro, Mass., and James Joseph
Cadden, Pawtucket, R.I., assignors to Texas Instruments Incorporated, Dallas, Tex., a corporation
of Delaware
Continuation of application Ser. No. 166,109, Jan. 15,
1962, which is a continuation-in-part of application
Ser. No. 87,357, Feb. 6, 1961. This application Aug.
26, 1965, Ser. No. 491,473
Int. Cl. B23k 31/02
U.S. Cl. 29—472.3                9 Claims

ABSTRACT OF THE DISCLOSURE

A method of metallurgically bonding stainless steel and aluminum together to form a composite material is shown to include the step of moving lengths of stainless steel and aluminum through individual paths from supplies of said lengths toward a squeezing device so that surfaces of said lengths are brought into contact with each other at the squeezing device. At least the aluminum length is heated in its path toward the squeezing device to provide a temperature differential in said lengths and to provide a temperature of about 400° F. to 1000° F. at the interface between said lengths at the squeezing device. The lengths are squeezed together in the squeezing device with sufficient reduction in the thickness of at least the aluminum length to form a metallurgical bond between the lengths. Preferably the temperature to which the stainless steel length is heated in its path toward the squeezing device is less than about 500° F. and reduction of the thickness of stainless steel length in the squeezing device is less than about 15% of its original thickness.

---

This invention is a continuation of my earlier filed continuation-in-part application, Ser. No. 166,109, filed Jan. 15, 1962, in the name of E. M. Jost and J. J. Cadden, which was filed on parent application Ser. No. 87,357, filed Feb. 6, 1961 in the name of E. M. Jost and J. J. Cadden, now abandoned.

This invention relates generally to composite metal stock, and to methods of making the same. With regard to certain more specific features, the invention particularly relates to continuous production of composite metal stock of relatively soft and hard component layers, which composite materials are particularly suitable for, though not limited to, production of cooking utensils, containers, etc., wherein, for example, such features as high strength, toughness, ductility, workability, resistance to staining and corrosion, and high heat conductivity are required.

It is one object of the present invention to provide new and improved methods for continuous production of such bonded composite materials in unlimited lengths.

It is a further object of this invention to provide an improved method for continuous bonding of a relatively thick, soft metal component to a relatively thin, hard though ductile metal component wherein the relatively hard component undergoes relatively little or in some cases where desired, no deformation during the bonding process.

Another object of the instant invention is to provide a method for continuous production of a composite metal body of aluminum and stainless steel in unlimited lengths, wherein the stainless steel component, prior to bonding, possesses certain desired characteristics and properties, which characteristics and properties are not substantially or deleteriously altered by the bonding process.

It is another object to provide improved composite aluminum clad stainless steel bodies predictably having desired properties suitable for use in the production of cooking utensils and the like.

Other objects will be in part apparent and in part pointed out hereinafter.

The invention accordingly comprises the elements and combinations of elements, steps and sequence of steps, features of construction and manipulation, and arrangements of parts, all of which will be exemplified in the structures and methods hereinafter described, and the scope of the application of which will be indicated in the following claims.

In the accompanying drawings, in which one of the various possible embodiments of the invention is illustrated:

FIG. 1 is a diagrammatic elevation of apparatus with which the invention may be carried out;

FIG. 2 is a greatly enlarged fragmentary cross section of one form of the composite material shown in FIG. 1, thicknesses being greatly exaggerated; and FIG. 3 is a greatly enlarged fragmentary cross section of another form of a composite material, thicknesses being greatly exaggerated, which may be made by the method diagrammatically illustrated in FIG. 1.

Dimensions of certain of the parts as shown in the drawings have been modified for the purposes of clarity of illustration.

Similar reference characters indicate corresponding parts throughout the several views of the drawings.

The instant application constitutes a continuation-in-part of our earlier filed co-pending application Ser. No. 87,357, filed Feb. 6, 1961.

The term "metals" is used herein in its broad sense including alloys.

It is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Since the amount of the composite metal stock or materials required for these uses, particularly by the cooking utensil industry, is relatively large (for example, current quantities required by the cooking utensil industry exceed several hundred thousand pounds per month), the cost thereof is a consideration of great importance.

We have discovered low-cost methods for producing composite stock of the class described, the component parts of which are firmly and tenaciously bonded together in a continuous manner and in unlimited lengths. The unlimited lengths of composite stock produced according to our invention advantageously lend themselves to mass production techniques in the fabrication and manufacture of cooking utensils or other products therefrom.

The composite stock produced according to our invention assures that the final composite stock produced will have the desired properties required, for example, for extreme deep drawing operations, such as may be required in the manufacture of cooking utensils. Typical prior art methods for producing composite sheet metal bodies of aluminum and stainless steel have generally been limited to the so-called "batch process" wherein discrete or limited lengths of composite material are separately or individually produced.

A typical example of such prior art "batch processes" is disclosed in the U.S. patent to Merritt et al., No. 2,171,-040, issued on Aug. 29, 1939. The Merritt patent discloses a method of joining a stainless steel sheet to an aluminum sheet, involving the steps of cleaning the sheets to form a roughened surface, placing the sheets in contact with each other, and thereafter heating both of the sheets; to reduce oxidation during heating, this method also proposes welding or riveting the outer edges of the metal sheets together to form an enveloped package; and for cooking utensils, preliminarily joining the sheets by effecting a preferred reduction in composite thickness of 15%–20%, with a corresponding reduction in the thickness of the stainless steel. After the composite metal is preliminarily joined, and (if desired) subjected to a drawing step, it is heated up to about the temperature of recrystallization of the aluminum to improve the bond.

It will be recognized that ductility of the composite product is an important characteristic where the composite material is to be subjected to deep drawing operations in the formation and manufacture of cooking utensils. The ductility of stainless steel decreases as the metal is cold worked (as by a reduction in its thickness), and this loss of ductility increases rapidly as the amount of cold work is increased.

We have discovered that (according to our invention), it is unexpectedly possible to create a metallurgical bond between relatively soft and relatively hard malleable metal components (such as aluminum and stainless steel) wherein the relatively hard (e.g. stainless steel) component undergoes little or (if required) substantially no reduction in thickness, during the bonding process. It is thus possible, according to our invention, to provide a stainless steel component which, prior to bonding, is in a fully annealed condition (having the desired characteristics, e.g. ductility and thickness, required in the bonded composite material) and to bond a layer of aluminum to this stainless steel component substantially without or at least without significantly deleteriously altering the thickness dimensions or the original (e.g. fully annealed) characteristics of the stainless steel component as required by the application for the resulting composite material. Providing the stainless steel component in a substantially fully annealed condition in the composite material advantageously avoids the necessity for and the problems attendant to subsequent annealing of the composite material. Further, in many if not most cases, particularly where aluminum and stainless steel components are involved subsequent annealing would not be practical or possible since the required annealing temperatures will, in many cases, exceed the melting point of the lower melting temperature component or that temperature at which brittle intermetallic compounds will form.

Referring now more particularly to the drawings, there is diagrammatically shown in FIG. 1, an apparatus which may be used in the practice of this invention. At 1 and 2 are shown two supply coils, respectively of aluminum 5 and stainless steel 7, in strip form, which are subsequently bonded together to form a composite product. The nature of the bond between the aluminum and stainless steel components of the composite stock according to our invention, is similar to the solid-state or solid-phase bond described in the Boessenkool et al., U.S. Patents Nos. 2,691,815 and 2,753,623, which are assigned to the assignee of the instant application. The method according to our invention generally comprises the steps of moving aluminum and stainless steel lengths 5 and 7 to the right, as seen in FIG. 1 (in the direction of the arrow) over idler rolls 9, to a cleaning step as at 11, thence to a heating step, as at 13; and then moving the lengths 5 and 7 over idler rolls 16 and 18 to and into interfacial contact just prior to entering a squeezing device (e.g. rolls 20 and 22) and passing lengths 5 and 7 through squeezing or reducing rolls 20 and 22 to effect a solid-phase bond between the lengths. Where the composite product is to be employed in the manufacture of cooking utensils, we provide the stainless steel strip 7 in a fully annealed condition having, prior to bonding, the properties and thickness which are ultimately desired for the stainless steel component in the bonded composite product.

The interfacial surfaces to be bonded of lengths 5 and 7 are cleaned at 11 to remove gross contaminants and barriers to bonding. In general, the cleaning step 11 of our method does not require the meticulous cleaning operation, as of the methods described in the above-referred to Boessenkool patents, and cleaning beyond the extent of removing gross contaminants and barriers to bonding is generally not necessary. Cleaning at 11 may be accomplished by various known means, such as, for example, scratch brushing, abrading or pickling. The aluminum component may also be cleaned by heating.

The term "aluminum" as employed herein includes alloys of aluminum.

We have found that the advantages of our invention (such as those described above and to be further described below) can be best achieved when the interfacial temperature of components 5 and 7 at the pinch point or point of squeezing, lies within a certain range. When components 5 and 7 are respectively aluminum and stainless steel, bonding according to our invention can be achieved when the interfacial temperature ranges from 400° F. to 1000° F. at the pinch point P of the rolls 20 and 22 (or at the point of squeezing), with optimum results achieved when the interfacial temperature ranges between 700° F. and 1000° F.

In practice, it is generally difficult to accurately measure interfacial temperatures at the point of squeezing. It is necessary to heat one or both of the components 5 and 7 to a temperature sufficient to provide the desired interfacial temperature. In the practice of the invention, it is preferred to heat only the aluminum component 5 (as illustrated in FIG. 1 of the drawings) and to heat it to a temperature sufficient to provide the interfacial temperature of 400° F. to 1000° F. described above, during squeezing. This differential heating (e.g., directly heating only the relatively soft aluminum component) may be effected, for example, by direct electrical resistance heating of the aluminum component.

It will be understood that when the heated aluminum component 5 is brought into contact with the relatively cold (unheated at room temperature) stainless steel component and is quenched thereby (after leaving idler rolls 16 and 18 and prior to entering between reducing rolls 20 and 22) there will be a reduction in temperature of the aluminum component, such as will provide an interfacial temperature within the desired range. The precise temperature to which the aluminum component should be heated to provide the desired interfacial temperature when the aluminum and unheated stainless steel components are placed into contact with each other will, of course, depend on such factors for example as the relative thickness of the components and the temperature of the rolls.

The aluminum component when heated to provide the desired interfacial temperature, becomes soft and more easily deformable to the extent that it actually smears the stainless steel component when the layers are squeezed together and as will be described in greater detail below, affords bonding of the two components with little or substantially no reduction taking place in the stainless steel component.

After the heating step, the components 5 and 7 are brought into interfacial contact and passed between reducing rolls 20 and 22, to create a metallurgical bond between the stainless steel and aluminum components. It is preferred that the squeezing of the components take place quickly after the cleaning and heating steps so as not to provide adequate time for the formation of brittle intermetallic compounds, barrier films, etc. It is also preferred that rolls 20 and 22 be heated. We have found that it is important to avoid quenching of the materials during reduction rolling by cool or cold rolls and that an increase in the temperature of the rolls generally results in an improvement of quality of the bond. The upper limit of the temperature of the rolls, when bonding aluminum to stainless steel, should be just below that temperature at which brittle intermetallic compounds of aluminum will form. The temperature to which the rolls 20 and 22 should be heated will depend on the size and nature of the equipment. As an example, we have found that with our present equipment, most successful results have been achieved when the temperature of the rolls ranged between 180° F. and 500° F.

Factors such as back tension, differential heating of components, bonding in line (continuous fashion) and feeding angles will affect the amount of composite reduction necessary to achieve satisfactory bonding. A preferred range for reduction of the softer aluminum component during bonding to provide a satisfactory bond, according to our invention, is 30% to 60% with the materials and rolls respectively at the interfacial and roll temperatures described above with the stainless steel component undergoing little or no reduction. It will be understood that satisfactory bonds may, in many cases, be achieved with greater or lesser reductions of the aluminum component than the preferred range mentioned above, with variations in the bonding parameters such as, for example, roll temperature, interfacial temperature, roll finish, roll lubrication, roll diameter, bonding speed, etc., and others mentioned above. We have found that we can obtain a satisfactory bond within the preferred aluminum component reduction range described above and with less than a 15% reduction in the thickness of the stainless steel component. We have also discovered that we can obtain a satisfactory bond (within the aforesaid composite reduction range) even with substantially no reduction in thickness of the stainless steel component. While we do not wish to be bound by any theories, we believe that these results are at least in part due to the very ductile, or soft and flowable (in the solid state) condition of the aluminum at the aforementioned elevated bonding temperatures. The aluminum, in this condition, tends to extrude easily and smear the relatively hard stainless steel components under the action of reducing rolls 20 and 22. Other factors contributing to thes results also include suitable back tension for the respective components.

Our invention is particularly advantageous in providing composite aluminum-stainless steel materials for manufacture of cooking utensils. For this application, the composite material must be suitably workable to undergo extreme fabrication steps such as, for example, drawing operations, which may be encountered in the manufacture of cooking utensils. The stainless steel component in such bonded composite materials is generally suitable when its D.P.H. (diamond pyramid hardness) does not exceed approximately 250. Such composite materials are also generally suitable for cooking utensil applications when the percent elongation thereof is at least approximately 25% (as measured over a two (2) inch gauge length) to assure required workability. A typical example of a stainless steel and aluminum composite material suitable for cooking utensils made in accordance with our invention is set forth in Example A in the following table.

EXAMPLE A

[Fig. 2 Type Product]

| Material | Mechanical Properties Prior to Heating and Bonding | | Mechanical Properties of Component After Bonding Without Sintering | | Gauge in Mils | | Composite Bond Reduction, percent | Bond Reduction of Stainless Steel Component, Percent |
|---|---|---|---|---|---|---|---|---|
| | Hardness (D.P.H.) | Percent Elongation | Hardness (D.P.H.) | Percent Elongation | Individual Component Starting Thickness | Individual Bonded Component Thickness | | |
| 302 Stainless Steel (fully annealed starting condition). | 170-173 | 55-60 | 243 | (²) | 5 ave. | 4.6 ave. | 32.5 | Ave. 8 |
| 3003 aluminum ¹ | 25 | 40 | 25 | (²) | 180 | 121.4 | | |

¹ An alloy consisting essentially by weight of 1.00% to 1.5% Mn; and impurities 0.20% (max.) Cu; 0.70% (max.) Fe; 0.60% (max.) Si; 0.10% (max.) Zn and 0.15% (max.) others.
² 41% for the composite material.

Advantageously, according to our invention it is possible to achieve satisfactory metallurgical (and solid-phase) bonds between the aluminum and stainless steel components with a reduction in thickness of the stainless steel component ranging from 0% to 15%. We have also found that the stainless steel component (in the bonded composite material) will generally retain substantially all of its fully annealed characteristics as generally required for the manufacture of cooking utensils, if the reduction in thickness of the stainless steel component does not exceed approximately 4% in the bonding process. It will be understood that in less critical cooking utensils applications percentage reductions of the bonded stainless steel component greater than 4% can be tolerated.

Although a single-clad aluminum-stainless steel composite material (as shown in FIG. 2) has been described thus far, it should be understood that a double-clad aluminum material, such as shown in FIG. 3, can also be produced within the practice of our invention. In the FIG. 3 double-clad product, the bonding faces of each of the stainless steel components 7″ would be cleaned along with the mating interfaces on the aluminum component 5″ in the manner described above for the bilayered material of FIG. 2. The method of producing the FIG. 3 product is the same in substantially all other respects as the method described above for the FIG. 2 product.

The composite layers 5′ and 7′, when bonded together, upon leaving reducing rolls 20 and 22, generally have the required bond strength (after a single pass) for mechanical working or fabrication, such as drawing operations, in the manufacture of cooking utensils. However, it may be desirable, in some cases, to increase the bond strength with a subsequent heating or sintering step, such as at 26. An example of a suitable sintering or heating step is a temperature of about 725° F. for a period of approximately 1 hour. A typical example of a FIG. 3 type product made in accordance with our invention wherein the above heating step was employed is set forth in Example B in the following table.

EXAMPLE B

[Double Clad Fig. 3 Type Product]

| Material | Mechanical Properties Prior to Heating and Bonding | | | Mechanical Properties of Components after Bonding and Sintering ² | | | Gauge in Mils | | Bond Reduction of Aluminum Component, Percent | Bond Reduction of Each Stainless Steel Component, Percent |
|---|---|---|---|---|---|---|---|---|---|---|
| | Hardness (D.P.H.) | Tensile Strength (p.s.i.) | Percent Elongation | Hardness (D.P.H.) | Tensile Strength (p.s.i.) | Percent Elongation | Individual Component Starting Thickness | Individual Bonded Component Thickness | | |
| 2 layers of 302 Stainless Steel (fully annealed starting condition). | 162 ave. | 80,000-90,000 | 55-60 | 210 | ³ 46,400 | ³ 57 | 15.6 | 15.2 | | 2.5 |
| 3003 Aluminum ¹ | 25 | 13,000 | 40 | 25 | | | 98.0 | 54.6 | 44.3 | |

¹ An alloy consisting essentially by weight of 1.00% to 1.5% Mn; and impurities 0.20% (max.) Cu; 0.70% (max.) Fe; 0.60% (max.) Si; 0.10% (max.) Zn and 0.15% (max.) others.
² Sintering step to improve bond strength was at 725° F. for 1 hour.
³ For the composite material.

Theoretically, the methods of our invention are not limited to any particular thickness ratios (either starting or finish thickness) of the aluminum and stainless steel components. As a practical matter, thickness limitations will depend on equipment limitations. As an example of the versatility of our method with our existing equipment, we have been able to bond a stainless steel component as little as 4 mils in starting thickness to an aluminum component which ranged from 20 mils to as high as 180 mils in starting thickness.

The preferred heating step described above advantageously obviates the necessity for providing a protective or reducing atmosphere for the components, which might be otherwise required if the stainless steel component were directly heated prior to bringing the components into interfacial contact. The stainless steel components, when heated to temperatures in excess of 400° F. to 500° F. tends to tarnish and develop surface formations of bond deterring contaminants.

Although the preferred heating step calls for heating only the aluminum component, the required interfacial temperature of 400° F. to 1000° F. can (within the purview of our invention) also be provided by sufficiently heating both the aluminum and stainless steel components.

The following examples of a typical combination of component thicknesses bonded according to our invention will illustrate the temperature ranges to which the components should be heated to provide the desired interfacial temperature range of 400° F. to 1000° F.

EXAMPLE C

[Single-Clad, Fig. 2 Type Product]

| | Starting Thickness | Temperature of Components Prior to Interfacial Contact |
|---|---|---|
| Material: | | |
| 3003 aluminum | 80 mils | 780° F. average.[1] |
| 304 stainless steel | 4.5 mils | 408° F. average.[2] |

[1] Temperature was measured at a point 10 inches from pinch point P of rolls 20 and 22.
[2] Temperature was measured at a point 5 inches from pinch point P of rolls 20 and 22.

EXAMPLE D

[Single-Clad, Fig. 2 Type Product]

| | Starting Thickness | Temperature of Components Prior to Interfacial Contact |
|---|---|---|
| Material: | | |
| 3003 aluminum | 180 mils | 700° F. average.[1] |
| 302 stainless steel | 8 mils | 440° F. average.[2] |

[1] Temperature was measured at a point 10 inches from pinch point P of rolls 20 and 22.
[2] Temperature was measured at a point 5 inches from pinch point P of rolls 20 and 22.

It is not necessary that the sintering step, as at 26, be performed in a controlled atmosphere insofar as any effects on the bond formation or quality are concerned. However, as a practical matter or a matter of commercial expediency, it is desirable to sinter in a controlled atmosphere so as to prevent tarnishing of the exposed surfaces of the stainless steel components which otherwise would have to be subjected to a cleaning step after sintering.

The following additional examples further illustrate the invention, particularly for continuous operations.

EXAMPLE E

We bonded a layer of AA1100 aluminum to a layer of Type 304 stainless steel as follows:

We used a continuous strip of 304 stainless steel [an alloy consisting of approximately 0.08% (max.) carbon, 18.0%–20.0% chromium, 8.00%–11.00% nickel, 2.00% (max.) manganese, and the balance iron] having a starting thickness of 5 mils, and a continuous strip of type AA1100 aluminum (which is a commercial designation for commercially pure aluminum) having a starting thickness of 36 mils. The stainless steel component was in a fully annealed condition, and had a hardness ranging from 150 to 195 D.P.H., and a percent elongation ranging from 55% to 60%. These strips were cleaned on their surfaces to be bonded, by scratch brushing to remove gross contaminants. The aluminum strip was then heated to a temperature of approximately 900° F. The two strips were then moved into interfacial contact and fed into a rolling mill for bonding in the manner illustrated in FIG. 1, and described above. The strips, upon entering the rolls of the rolling mill, had an interfacial temperature lying within the range of 400° F. to 1000° F. The back tension applied to the stainless steel strip was considerably greater than that applied to the aluminum strip. The rolls of the rolling mill were heated to a temperature of about 150° F. to 400° F., and were set for a reduction of about 10% resulting in a total composite overall thickness of approximately 37 mils. The bonded finish thickness of the stainless steel component remained substantially at 5 mils (i.e., substantially unchanged from its starting thickness). The composite bonded material issuing from the mill was wound in a tight coil being bonded sufficiently for subsequent handling. The hardness of the steel component in the bonded material was slightly increased to about 220 to 230 D.P.H. The bonded material was then heated to improve the quality of the bond at a temperature of about 950° F. for a period of about 3 hours.

EXAMPLE F

Example F was similar to Example E except for starting thicknesses and that an additional stainless steel strip was bonded to the other surface of the aluminum component to form a double-clad product, such as that illustrated in FIG. 3. In this example, each of the stainless steel components had an initial starting thickness of 7 mils, and the aluminum component had an initial starting thickness of 37 mils, giving a total initial starting thickness of 51 mils. The same rolling mill as Example E was used, set for a reduction of about 27% resulting in an overall finish thickness of approximately 37 mils. The thickness of the stainless steel components in the bonded composite material remained substantially unchanged. The strips were bonded in the manner described above, and were differentially heated prior to entering the rolls. The aluminum strip was heated to a temperature of about 1000° F. and each of the stainless steel strips were heated to about 400° F. The strips, on entering the rolling mill, had an interfacial temperature in the range of 400° F. to 1000° F. The bonded, three-layer strip was then sintered in coil form to improve the quality of the bond for about 3 hours, at a temperature of about 950° F.

Although the composite materials made according to our invention, are particularly advantageous for the manufacture of cooking utensils, it should be understood that such materials have utility in other and diverse applications, such as for example, in the manufacture of tubing and other clad products.

As many changes could be made in the above constructions and methods without departing from the scope of the invention, it is intended that all matter contained in the above description or shown in the accompanying drawings, shall be interpreted as illustrative and not in a limiting sense, and it is also intended that the appended claims shall cover all such equivalent variations as come within the true spirit and scope of the invention.

We claim:

1. A method of bonding stainless steel and aluminum comprising moving lengths of stainless steel and aluminum through individual paths from supplies of said lengths toward a squeezing device so that surfaces of said respective lengths are contacted with each other at said squeezing device; individually heating at least said aluminum length in its path toward said squeezing device and quickly moving said lengths into said contact at said squeezing device, said heating providing a higher temperature in said aluminum length than in said stainless steel length and providing a temperature in the range from 400° F. to 1000° F. at the interface between said lengths at said squeezing device; and immediately squeezing said lengths together at said squeezing device with reduction in the thickness of at least said aluminum length to form a metallurgical bond between said lengths.

2. A method as set forth in claim 1 wherein said stainless steel length is moved in air in its path to said squeezing device and the temperature to which said stainless steel length is heated in its path toward said squeezing device does not exceed 500° F.

3. A method as set forth in claim 1 wherein said heating provides a temperature in the range from 700° F. to 1000° F. at said interface.

4. A method as set forth in claim 1 wherein said surface of said aluminum length to be contacted with said stainless steel length is cleaned for removing barriers to bonding therefrom before said surface is contacted with said stainless steel length.

5. A method of bonding stainless steel and aluminum comprising moving lengths of stainless steel and aluminum through individual paths from supplies of said lengths toward a squeezing device so that surfaces of said lengths are in contact at said squeezing device; individually heating said aluminum length and said stainless steel length in their paths then toward said squeezing device and quickly moving said lengths into said contact as said squeezing device, said heating providing a higher temperature in said aluminum length than in said stainless steel length and providing a temperature of 400° F. to 1000° F. at the interface between said lengths at said squeezing device; and immediately squeezing said lengths together at said squeezing device with greater reduction in the thickness of said aluminum length than in the thickness of said stainless steel length to form a metallurgical bond between said lengths.

6. A method of bonding stainless steel and aluminum comprising moving lengths of aluminum and stainless steel through individual paths from supplies of said lengths toward a squeezing device so that surfaces of said lengths are in contact at said squeezing device; individually heating said aluminum length in its path toward said squeezing device and quickly moving said lengths into said contact at said squeezing device, said heating providing a higher temperature in said aluminum length than in said stainless steel length and providing a temperature in the range from 400° F. to 1000° F. at the interface between said lengths at said squeezing device; and immediately squeezing said lengths together at said squeezing device with reduction in the thickness of at least said aluminum length to form a metallurgical bond between said lengths.

7. A method as set forth in claim 1 wherein said length of stainless steel is initially in substantially fully annealed condition and wherein said lengths are squeezed together with less than about 15% reduction in the thickness of said stainless steel length for retaining said stainless steel length in substantially fully annealed condition and with substantially greater reduction in the thickness of said aluminum length to form said metallurgical bond between said lengths.

8. A method as set forth in claim 7 wherein said lengths are squeezed together with substantially no reduction in the thickness of said stainless steel length.

9. A method as set forth in claim 1 wherein said lengths are heated after formation of said bond for improving the bond between said lengths.

References Cited

UNITED STATES PATENTS

| | | | |
|---|---|---|---|
| 2,171,040 | 8/1939 | Merritt. | |
| 2,691,815 | 10/1954 | Boessenkool. | |
| 2,753,623 | 7/1956 | Boessenkool | 29—497.5 |
| 2,879,587 | 3/1959 | Mushovic | 29—488 |
| 2,908,073 | 10/1959 | Dulin | 29—488 |
| 3,093,885 | 6/1963 | Morrison. | |
| 3,095,500 | 6/1963 | Jost | 29—497.5 X |
| 3,173,202 | 3/1965 | Farber | 29—487 |
| 3,210,840 | 10/1965 | Ulam | 29—488 |

JOHN F. CAMPBELL, Primary Examiner

J. L. CLINE, Assistant Examiner

U.S. Cl. X.R.

29—497.5, 498, 504